J. KARITZKY.
CONDUIT OR CABLE CLAMP AND BRIDLE RING.
APPLICATION FILED JAN. 23, 1920.
1,365,617.  Patented Jan. 11, 1921.
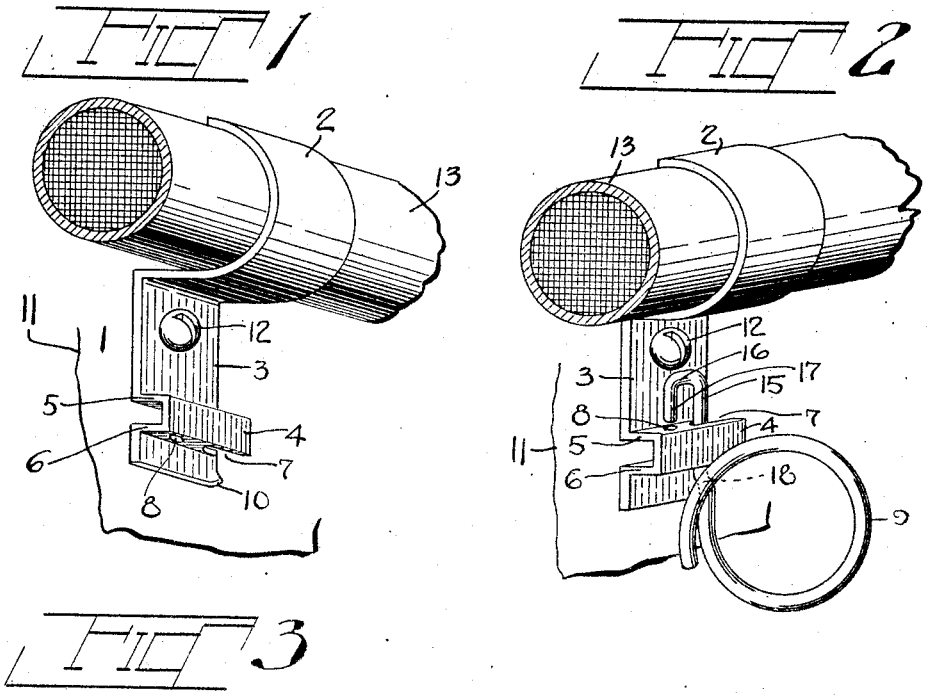
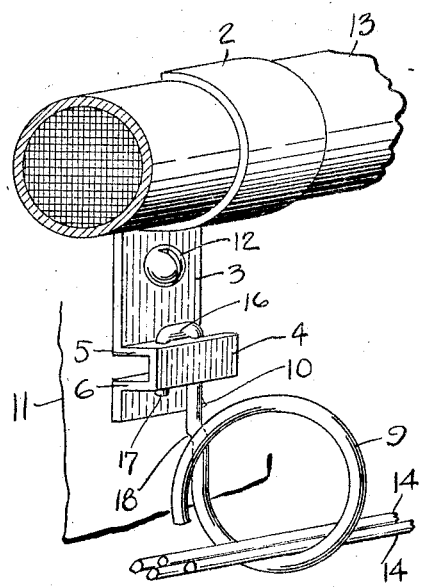
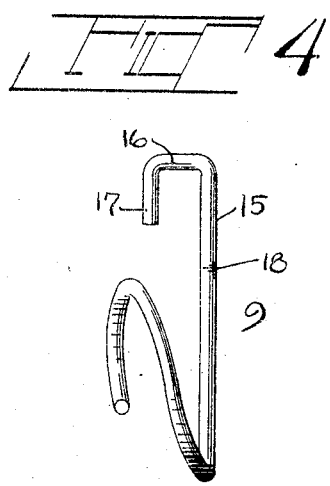
INVENTOR
John Karitzky
BY
Alahn Johnson
ATTORNEY

UNITED STATES PATENT OFFICE.

JOHN KARITZKY, OF GARWOOD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,617.  Specification of Letters Patent.  Patented Jan. 11, 1921.

Application filed January 23, 1920. Serial No. 353,615.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a socket or recess in which both the shank and the end of my bridle ring are positively locked.

My invention further relates to a bridle ring to be used with my conduit or cable clamp.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures, in which I have shown, as an example, one embodiment of my invention, the same reference numerals refer to similar parts in the several figures.

Figure 1 is a perspective view of my conduit or cable clamp and of a cable which it supports;

Fig. 2 is a perspective view of the conduit or cable clamp shown in Fig. 1 with my improved bridle ring about to be locked in said clamp;

Fig. 3 is a perspective view of my conduit or cable clamp with the bridle ring locked in said clamp;

Fig. 4 is a perspective view of my bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my conduit or cable clamp 1 with a hook portion 2 and a base 3. Preferably, though not necessarily, my conduit or cable clamp is formed of pressed sheet metal. I provide the base 3 with engaging and locking surfaces, to positively lock one end of a pig tail bridle ring, without the aid of screwthreads.

I have shown one embodiment of my invention in which the engaging surfaces are formed principally in a bent portion of the base. When the clamp is made out of sheet material a portion of the base 3 is preferably bent or stamped to form an integral U-shaped locking member 4 having arms 5 and 6, Fig. 1. Both arms 5 and 6 are provided, for a portion of their length, with registering slots 7, 7. The arms 5 and 6 are also provided with registering locking surfaces in the form of holes 8, 8. The cable clamp is also preferably, though not necessarily, provided with another locking surface to engage with the bridle ring 9.

Preferably I form this additional locking surface by bending up one corner of the base 3 to form a locking tit 10.

The cable or conduit clamp 1 is supported on the wall or other suitable support 11 by means of the screw 12, which also serves to support the cable 13.

Whenever the traffic upon the cable 12 becomes excessive and it is not expedient to replace it by a cable of greater capacity, the capacity of the line can be quickly and economically increased, to meet the additional traffic load, by stringing runs of bridle wires 14, 14 by means of the bridle ring 9 without interfering with the screw 12 or otherwise disturbing the original installation. The bridle ring 9 is preferably of the pig tail type having a shank 15, the end of the shank being bent back on itself to form a U-shaped member or hook 16 having an engaging arm 17.

To position the parts, the shank 15 is passed laterally along the slots 7, 7 in the arms 5 and 6 until it reaches the end of said slots, Fig. 2. The bridle ring is then manipulated until the engaging arm 17 comes in alinement with the holes 8, 8 in the arms 5 and 6. A slight downward pressure on the bridle ring then causes the engaging arm 17 to engage with both the holes 8, 8 which securely holds the bridle ring to the conduit or cable clamp 1. Preferably, though not necessarily, the clamp is provided with another engaging or locking surface to assist in locking the bridle ring. The locking tit 10 performs this function. To permit more ready manipulation of the parts, I preferably provide the shank 9 with a slight bend or offset 18 which comes opposite the locking tit 10 when the parts are being assembled or disassembled but is out of line with the tit 10 when the parts are all in their operative position, Fig. 3.

Should it ever be desirable to remove the bridle wires 14, 14 and the bridle ring 9, this can easily be done by moving the entire bridle ring 9 vertically until the arm 17 is disengaged from both the holes 8, 8 and, if the locking tit 10 is employed, until the offset 18 is brought opposite said tit, when the entire bridle ring 9 can be slipped out from the slots 7, 7 in the arms 5 and 6.

In my invention the conduit or cable clamp is positioned without interference with the bridle ring. No tapping or screw-threading of the conduit or cable clamp is required, nor is it necessary to place screw-threads upon my bridle ring, all of which greatly reduces the labor cost as well as reduces the amount of metal necessary to make my conduit or cable clamp.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook and a base, the base having a raised portion slotted from one side toward the center of the base and provided with locking surfaces to coöperate with a bridle ring.

2. A conduit or cable clamp provided with a hook and a base, the base being provided with a raised portion having a transverse slot extending from one side of the clamp toward the middle, the raised portion also being provided with locking holes to coöperate with a bridle ring.

3. A conduit or cable clamp provided with a hook and a base, the base having a raised portion provided with a slot and with locking surfaces and a locking tit to coöperate with a bridle ring.

4. A conduit or cable clamp formed out of pressed sheet material having a hook and base portion, the base being provided with a crimped or bent portion extending above the plane of the base, the sides of the crimped or bent portion being provided with transverse slots extending from one side of the clamp toward the middle, the crimped or bent portion being also provided with locking surfaces to coöperate with a bridle ring.

5. A conduit or cable clamp formed out of pressed sheet material having a hook and base portion, the base being provided with a crimped or bent portion provided with a slot and with means to engage the end of a bridle ring, the base portion also being provided with a locking tit.

6. A conduit or cable clamp formed out of pressed sheet material having a hook and a base portion, the base being provided with a U-shaped extension, the arms of the U-shaped member being provided with registering slots and registering holes to coöperate with a bridle ring.

7. The combination of a conduit or cable clamp provided with a hook and a base, the base having a raised portion provided with a slot and with locking surfaces to coöperate with a bridle ring and a pig tail bridle ring coöperating with said locking surfaces.

8. The combination of a conduit or cable clamp provided with a hook and a base, the base having a raised portion provided with a slot and with locking holes and a locking tit to coöperate with a bridle ring, and a pig tail bridle ring coöperating with said locking surfaces and said locking tit.

9. The combination of a conduit or cable clamp provided with a hook and a base, the base having a raised portion slotted from one side toward the center of the base and provided with locking surfaces to coöperate with a bridle ring and a bridle ring having one of its ends coöperating with the slotted raised portion and the locking surfaces.

10. The combination of a conduit or cable clamp formed out of pressed sheet material having a hook and base portion, the base being provided with a crimped or bent portion provided with a slot and with means to engage the end of a bridle ring, the base portion also being provided with a locking tit, and a pig tail bridle ring coöperating with said locking tit and said slot and engaging means.

11. A pigtail bridle ring provided with a vertical shank having an offset portion, the end of the shank being bent to form a U-shaped locking member adapted to engage with a conduit or cable clamp, the other end of the shank being bent back on itself to form an open ring which normally lies below the U-shaped locking member.

JOHN KARITZKY.

Witnesses:
F. W. KARITZKY,
W. A. HUSLER.